United States Patent
Willmott et al.

(10) Patent No.: US 11,221,156 B2
(45) Date of Patent: Jan. 11, 2022

(54) CENTRAL PLANT CONTROL SYSTEM WITH DECAYING CAPACITY ADJUSTMENT

(71) Applicant: Johnson Controls Technology Company, Auburn Hills, MI (US)

(72) Inventors: Graeme Willmott, West Milwaukee, WI (US); Matthew J. Asmus, Watertown, WI (US); Jared W. Fread, Milwaukee, WI (US); Ryan C. Beaty, Milwaukee, WI (US); Shawn A. Schlagenhaft, Fond du Lac, WI (US)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 447 days.

(21) Appl. No.: 16/389,731

(22) Filed: Apr. 19, 2019

(65) Prior Publication Data

US 2019/0323718 A1    Oct. 24, 2019

Related U.S. Application Data

(60) Provisional application No. 62/662,103, filed on Apr. 24, 2018.

(51) Int. Cl.
*G05B 21/00* (2006.01)
*G01M 1/38* (2006.01)
(Continued)

(52) U.S. Cl.
CPC .............. *F24F 11/38* (2018.01); *F24F 11/64* (2018.01); *F24F 11/65* (2018.01); *G05B 19/042* (2013.01);
(Continued)

(58) Field of Classification Search
CPC .. F24F 11/38; F24F 11/64; F24F 11/65; F24F 2140/00; F24F 2140/50; F24F 2140/60; G05B 19/042; G05B 2219/2614
See application file for complete search history.

(56) References Cited

U.S. PATENT DOCUMENTS 9,612,601 B2    4/2017  Beyhaghi et al.
10,101,731 B2  10/2018  Asmus et al.
(Continued)

OTHER PUBLICATIONS

U.S. Appl. No. 15/824,618, filed Nov. 28, 2017, Ostrye et al.
(Continued)

*Primary Examiner* — Zhipeng Wang
(74) *Attorney, Agent, or Firm* — Foley & Lardner LLP

(57) ABSTRACT

Disclosed herein are related to a method, a system, and a non-transitory computer readable medium storing instructions for operating a group of central plant equipment to serve thermal energy loads of a building or building system. In one approach, a base capacity of one or more devices of the group of central plant equipment is identified. A change in requested load allocated to the one or more devices crossing the base capacity at a crossover time may be detected. In one approach, an adjusted capacity of the one or more devices is set such that the adjusted capacity is offset from the base capacity before the crossover time and decays toward the base capacity during a decay period after the crossover time. The requested load allocated may be compared with the adjusted capacity after the crossover time. The group of central plant equipment may be operated according to the comparison.

20 Claims, 9 Drawing Sheets

(51) Int. Cl.
   *G05B 13/00*    (2006.01)
   *G05B 15/00*    (2006.01)
   *G05D 23/00*    (2006.01)
   *F24F 11/38*    (2018.01)
   *G05B 19/042*   (2006.01)
   *F24F 11/64*    (2018.01)
   *F24F 11/65*    (2018.01)
   *F24F 140/60*   (2018.01)
   *F24F 140/00*   (2018.01)

(52) U.S. Cl.
   CPC ....... *F24F 2140/00* (2018.01); *F24F 2140/60* (2018.01); *G05B 2219/2614* (2013.01)

(56) References Cited

U.S. PATENT DOCUMENTS

| | | | |
|---|---|---|---|
| 10,190,789 B2 | 1/2019 | Mueller et al. | |
| 2013/0087319 A1* | 4/2013 | Havard | F04D 27/004 165/244 |
| 2013/0291576 A1* | 11/2013 | Wada | F25D 29/00 62/129 |
| 2015/0142181 A1* | 5/2015 | Stachler | G05B 13/00 700/276 |
| 2016/0349772 A1* | 12/2016 | Simon | G05D 23/1917 |
| 2017/0212488 A1 | 7/2017 | Kummer et al. | |
| 2018/0340702 A9 | 11/2018 | Turney et al. | |
| 2019/0011145 A1 | 1/2019 | Willmott et al. | |
| 2019/0032942 A1 | 1/2019 | Willmott et al. | |
| 2019/0032943 A1 | 1/2019 | Willmott et al. | |
| 2019/0032944 A1 | 1/2019 | Wenzel et al. | |
| 2019/0032945 A1 | 1/2019 | Willmott et al. | |
| 2019/0032947 A1 | 1/2019 | Willmott et al. | |
| 2019/0032949 A1 | 1/2019 | Willmott et al. | |
| 2019/0033800 A1 | 1/2019 | Elbsat et al. | |

OTHER PUBLICATIONS

U.S. Appl. No. 15/824,706, filed Nov. 28, 2017, Ostrye, Nathan T.
U.S. Appl. No. 16/122,399, filed Sep. 5, 2018, Turney et al.

* cited by examiner

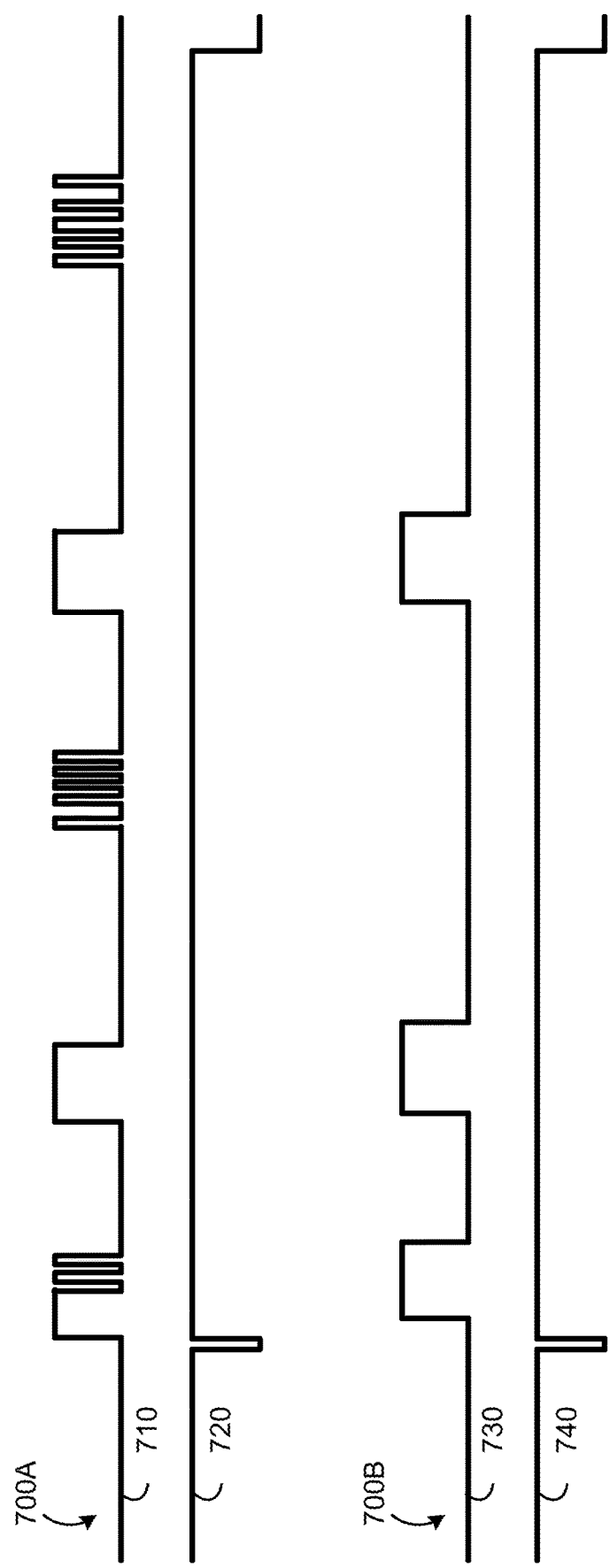

CENTRAL PLANT CONTROL SYSTEM WITH DECAYING CAPACITY ADJUSTMENT

CROSS REFERENCE TO RELATED APPLICATION

This application claims priority to U.S. Provisional Patent Application No. 62/662,103, filed Apr. 24, 2018, which is incorporated by reference herein in its entirety for all purposes.

BACKGROUND

The present disclosure relates generally to the operation of a central plant for serving building thermal energy loads. The present disclosure relates more particularly to systems and methods for optimizing the operation of one or more subplants of a central plant.

A central plant may include various types of equipment configured to serve the thermal energy loads of a building or building campus (i.e., a system of buildings). For example, a central plant may include heaters, chillers, heat recovery chillers, cooling towers, or other types of equipment configured to provide heating or cooling for the building. Some central plants include thermal energy storage configured to store the thermal energy produced by the central plant for later use.

A central plant may consume resources from a utility (e.g., electricity, water, natural gas, etc.) to heat or cool working fluid (e.g., water, glycol, etc.) that is circulated to the building or stored for later use to provide heating or cooling for the building. Fluid conduits typically deliver the heated or chilled fluid to air handlers located on the rooftop of the building or to individual floors or zones of the building. The air handlers push air past heat exchangers (e.g., heating coils or cooling coils) through which the working fluid flows to provide heating or cooling for the air. The working fluid then returns to the central plant to receive further heating or cooling and the cycle continues.

As variables such as temperature and humidity vary, the central plant may cycle on or off multiple components including chillers, heaters, pumps, and cooling towers to provide the varying thermal energy loads of the building. Cycling on or off one or more components for a short time period may be inefficient in terms of energy usage. However, it is challenging and difficult to efficiently cycle on or off, or override such cycling.

SUMMARY

Various embodiments disclosed herein are related to a method for operating a group of central plant equipment to serve thermal energy loads of a building or building system. In some embodiments, the method includes identifying a base capacity of one or more devices of the group of central plant equipment. In some embodiments, the method includes detecting a change in requested load allocated to the one or more devices crossing the base capacity at a crossover time. In some embodiments, the method includes setting an adjusted capacity of the one or more devices such that the adjusted capacity is offset from the base capacity before the crossover time and decays toward the base capacity during a decay period after the crossover time. In some embodiments, the method includes comparing the requested load allocated to the one or more devices with the adjusted capacity after the crossover time. In some embodiments, the method includes operating the group of central plant equipment based on whether the requested load allocated to the one or more devices is above or below the adjusted capacity.

In some embodiments, setting the adjusted capacity of the one or more devices includes linearly decaying the adjusted capacity toward the base capacity during the decay period.

In some embodiments, setting the adjusted capacity of the one or more devices includes non-linearly decaying the adjusted capacity toward the base capacity during the decay period.

In some embodiments, setting the adjusted capacity of the one or more devices includes offsetting the adjusted capacity prior to the crossover time to be higher than the base capacity, and decreasing the adjusted capacity toward the base capacity during the decay period.

In some embodiments, operating the group of central plant equipment includes activating a device of the one or more devices, in response to the adjusted capacity dropping below the requested load.

In some embodiments, setting the adjusted capacity of the one or more devices includes offsetting the adjusted capacity prior to the crossover time to be lower than the base capacity, and increasing the adjusted capacity toward the base capacity during the decay period.

In some embodiments, operating the group of central plant equipment includes deactivating a device of the one or more devices, in response to the adjusted capacity rising above the requested load.

Various embodiments disclosed herein are related to a non-transitory computer readable medium for operating a group of central plant equipment to serve thermal energy loads of a building or building system. In some embodiments, the non-transitory computer readable medium stores instructions when executed by a processor cause the processor to: identify a base capacity of one or more devices of the group of central plant equipment, detect a change in requested load allocated to the one or more devices crossing the base capacity at a crossover time, set an adjusted capacity of the one or more devices such that the adjusted capacity is offset from the base capacity before the crossover time and decays toward the base capacity during a decay period after the crossover time, compare the requested load allocated to the one or more devices with the adjusted capacity after the crossover time, and operate the group of central plant equipment based on whether the requested load allocated to the one or more devices is above or below the adjusted capacity.

In some embodiments, the instructions when executed by the processor cause the processor to set the adjusted capacity of the one or more devices further include instructions when executed by the processor cause the processor to linearly decay the adjusted capacity toward the base capacity during the decay period.

In some embodiments, the instructions when executed by the processor cause the processor to set the adjusted capacity of the one or more devices further include instructions when executed by the processor cause the processor to non-linearly decay the adjusted capacity toward the base capacity during the decay period.

In some embodiments, the instructions when executed by the processor cause the processor to set the adjusted capacity of the one or more devices further include instructions when executed by the processor cause the processor to offset the adjusted capacity prior to the crossover time to be higher than the base capacity, and decrease the adjusted capacity toward the base capacity during the decay period.

In some embodiments, the instructions when executed by the processor cause the processor to operate the group of central plant equipment further include instructions when executed by the processor cause the processor to activate a device of the one or more devices, in response to the adjusted capacity dropping below the requested load.

In some embodiments, the instructions when executed by the processor cause the processor to set the adjusted capacity of the one or more devices further include instructions when executed by the processor cause the processor to offset the adjusted capacity prior to the crossover time to be lower than the base capacity, and increase the adjusted capacity toward the base capacity during the decay period.

In some embodiments, the instructions when executed by the processor cause the processor to operate the group of central plant equipment further include instructions when executed by the processor cause the processor to deactivate a device of the one or more devices, in response to the adjusted capacity rising above the requested load.

Various embodiments disclosed herein are related to a system for operating a group of central plant equipment to serve thermal energy loads of a building or building system. In some embodiments, the system includes a processor and a non-transitory computer readable medium storing instructions when executed by the processor cause the processor to identify a base capacity of one or more devices of the group of central plant equipment, detect a change in requested load allocated to the one or more devices crossing the base capacity at a crossover time, set an adjusted capacity of the one or more devices such that the adjusted capacity is offset from the base capacity before the crossover time and decays toward the base capacity during a decay period after the crossover time, compare the requested load allocated to the one or more devices with the adjusted capacity after the crossover time, and operate the group of central plant equipment based on whether the requested load allocated to the one or more devices is above or below the adjusted capacity.

In some embodiments, the instructions when executed by the processor cause the processor to set the adjusted capacity of the one or more devices further include instructions when executed by the processor cause the processor to linearly decay the adjusted capacity toward the base capacity during the decay period.

In some embodiments, the instructions when executed by the processor cause the processor to set the adjusted capacity of the one or more devices further include instructions when executed by the processor cause the processor to non-linearly decay the adjusted capacity toward the base capacity during the decay period.

In some embodiments, the instructions when executed by the processor cause the processor to set the adjusted capacity of the one or more devices further include instructions when executed by the processor cause the processor to offset the adjusted capacity prior to the crossover time to be higher than the base capacity, and decrease the adjusted capacity toward the base capacity during the decay period.

In some embodiments, the instructions when executed by the processor cause the processor to operate the group of central plant equipment further include instructions when executed by the processor cause the processor to activate a device of the one or more devices, in response to the adjusted capacity dropping below the requested load.

In some embodiments, the instructions when executed by the processor cause the processor to set the adjusted capacity of the one or more devices further include instructions when executed by the processor cause the processor to offset the adjusted capacity prior to the crossover time to be lower than the base capacity, and increase the adjusted capacity toward the base capacity during the decay period.

BRIEF DESCRIPTION OF THE DRAWINGS

FIG. 7 is a set of timing diagrams illustrating the change in operating states of multiple devices within a subplant, according to an exemplary embodiment.

DETAILED DESCRIPTION

Referring generally to the FIGURES, systems and methods for low level central plant optimization and are shown, according to various exemplary embodiments. The systems and methods described herein may be used to control the equipment of a central plant that provides heating and/or cooling for a building or building campus (i.e., a system of buildings). A central plant may include a plurality of subplants, each configured to perform a particular function. For example, a central plant may include a heater subplant, a chiller subplant, a heat recovery chiller subplant, a hot thermal energy storage subplant, a cold thermal energy storage subplant, etc.

Various embodiments disclosed herein are related to a method, a system, and a non-transitory computer readable medium storing instructions for delaying control of a group of central plant equipment. In one approach, a system identifies a base capacity of one or more devices of the group of central plant equipment. The system detects a change in requested load allocated to the one or more devices crossing the base capacity at a crossover time. In response to the requested load crossing the base capacity, the system decays (e.g., increases or decreases) an adjusted capacity of the one or more devices of the group of central plant equipment using a decay function during a decay period after the crossover time toward. An adjusted capacity is a threshold that causes a change in operation of at least one device from the one or more devices of the group of central plant equipment. The system may compare the requested load with the decaying adjusted capacity. The system determines whether to activate or deactivate the least one device of the one or more devices of the group of central plant equipment based on whether the requested load is above or below the decaying adjusted capacity.

Advantageously, a control of one or more devices in a group of central plant equipment may be delayed, according to a rate of change (e.g., decaying) of the adjusted capacity. For example, if a device is disabled, an adjusted capacity may be configured to be higher than a base capacity. When detecting requested load exceeding the base capacity, the adjusted capacity may linearly, or non-linearly decay for a time period toward the base capacity. While the adjusted capacity is decaying, the requested load may exceed the base capacity but may be still less than the adjusted capacity. In one aspect, the device remains disabled, until the requested load satisfies (or exceeds) the adjusted capacity. If the requested load satisfies (or exceeds) the adjusted capacity, then the device may be enabled. By delaying enabling or disabling of a device, short cycling of the device may be obviated. Moreover, the device may be operated in an energy efficient manner by obviating inefficient short cycling of the device.

Figure 1:
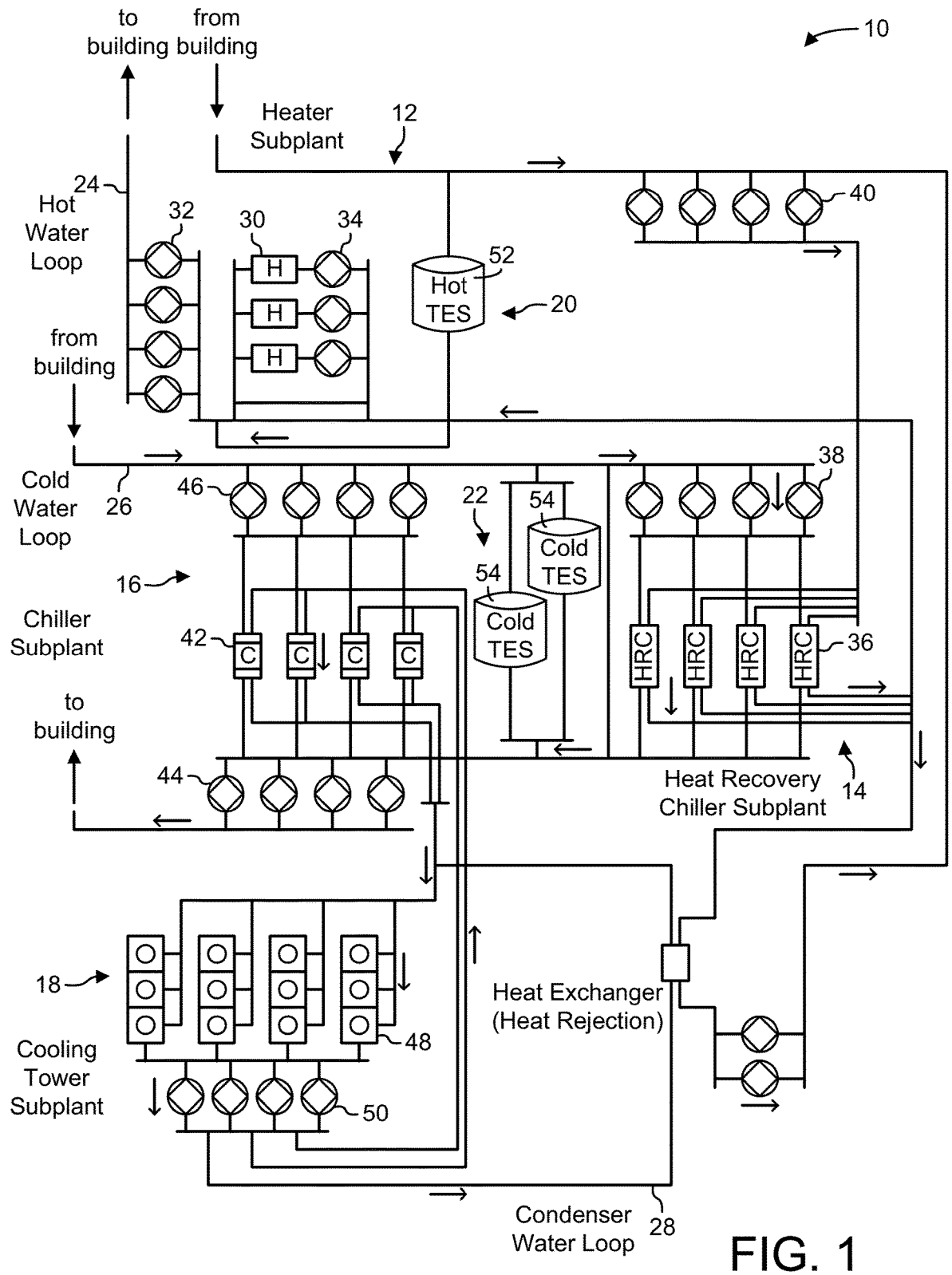
FIG. 1 is a diagram of a central plant including a plurality of subplants operable to serve the thermal energy loads of a building or building system, according to an exemplary embodiment.

Referring now to FIG. 1, a diagram of a central plant 10 is shown, according to an exemplary embodiment. Central plant 10 is shown to include a plurality of subplants including a heater subplant 12, a heat recovery chiller subplant 14, a chiller subplant 16, a cooling tower subplant 18, a hot thermal energy storage (TES) subplant 20, and a cold thermal energy storage (TES) subplant 22. Subplants 12-22 consume resources (e.g., water, natural gas, electricity, etc.) from utilities to serve the thermal energy loads (e.g., hot water, cold water, heating, cooling, etc.) of a building or campus. For example, heater subplant 12 may be configured to heat water in a hot water loop 24 that circulates the hot water between central plant 10 and a building (not shown). Chiller subplant 16 may be configured to chill water in a cold water loop 26 that circulates the cold water between central plant 10 and the building. Heat recovery chiller subplant 14 may be configured to transfer heat from cold water loop 26 to hot water loop 24 to provide additional heating for the hot water and additional cooling for the cold water. Condenser water loop 28 may absorb heat from the cold water in chiller subplant 16 and reject the absorbed heat in cooling tower subplant 18 or transfer the absorbed heat to hot water loop 24. Hot TES subplant 20 and cold TES subplant 22 store hot and cold thermal energy, respectively, for subsequent use.

Hot water loop 24 and cold water loop 26 may deliver the heated and/or chilled water to air handlers located on the rooftop of a building or to individual floors or zones of the building. The air handlers push air past heat exchangers (e.g., heating coils or cooling coils) through which the water flows to provide heating or cooling for the air. The heated or cooled air may be delivered to individual zones of the building to serve the thermal energy loads of the building. The water then returns to central plant 10 to receive further heating or cooling in subplants 12-22.

Although central plant 10 is shown and described as heating and cooling water for circulation to a building, it is understood that any other type of working fluid (e.g., glycol, $CO_2$, etc.) may be used in place of or in addition to water to serve the thermal energy loads. In other embodiments, central plant 10 may provide heating and/or cooling directly to the building or campus without requiring an intermediate heat transfer fluid. Central plant 10 may be physically separate from a building served by subplants 12-22 or physically integrated with the building (e.g., located within the building).

Each of subplants 12-22 may include a variety of equipment configured to facilitate the functions of the subplant. For example, heater subplant 12 is shown to include a plurality of heating elements 30 (e.g., boilers, electric heaters, etc.) configured to add heat to the hot water in hot water loop 24. Heater subplant 12 is also shown to include several pumps 32 and 34 configured to circulate the hot water in hot water loop 24 and to control the flow rate of the hot water through individual heating elements 30. Heat recovery chiller subplant 14 is shown to include a plurality of heat recovery heat exchangers 36 (e.g., refrigeration circuits) configured to transfer heat from cold water loop 26 to hot water loop 24. Heat recovery chiller subplant 14 is also shown to include several pumps 38 and 40 configured to circulate the hot water and/or cold water through heat recovery heat exchangers 36 and to control the flow rate of the water through individual heat recovery heat exchangers 36.

Chiller subplant 16 is shown to include a plurality of chillers 42 configured to remove heat from the cold water in cold water loop 26. Chiller subplant 16 is also shown to include several pumps 44 and 46 configured to circulate the cold water in cold water loop 26 and to control the flow rate of the cold water through individual chillers 42. Cooling tower subplant 18 is shown to include a plurality of cooling towers 48 configured to remove heat from the condenser water in condenser water loop 28. Cooling tower subplant 18 is also shown to include several pumps 50 configured to circulate the condenser water in condenser water loop 28 and to control the flow rate of the condenser water through individual cooling towers 48.

Hot TES subplant 20 is shown to include a hot TES tank 52 configured to store the hot water for later use. Hot TES subplant 20 may also include one or more pumps or valves configured to control the flow rate of the hot water into or out of hot TES tank 52. Cold TES subplant 22 is shown to include cold TES tanks 54 configured to store the cold water for later use. Cold TES subplant 22 may also include one or more pumps or valves configured to control the flow rate of the cold water into or out of cold TES tanks 54. In some embodiments, one or more of the pumps in central plant 10 (e.g., pumps 32, 34, 38, 40, 44, 46, and/or 50) or pipelines in central plant 10 include an isolation valve associated therewith. In various embodiments, isolation valves may be integrated with the pumps or positioned upstream or downstream of the pumps to control the fluid flows in central plant 10. In other embodiments, more, fewer, or different types of devices may be included in central plant 10.

Figure 2:
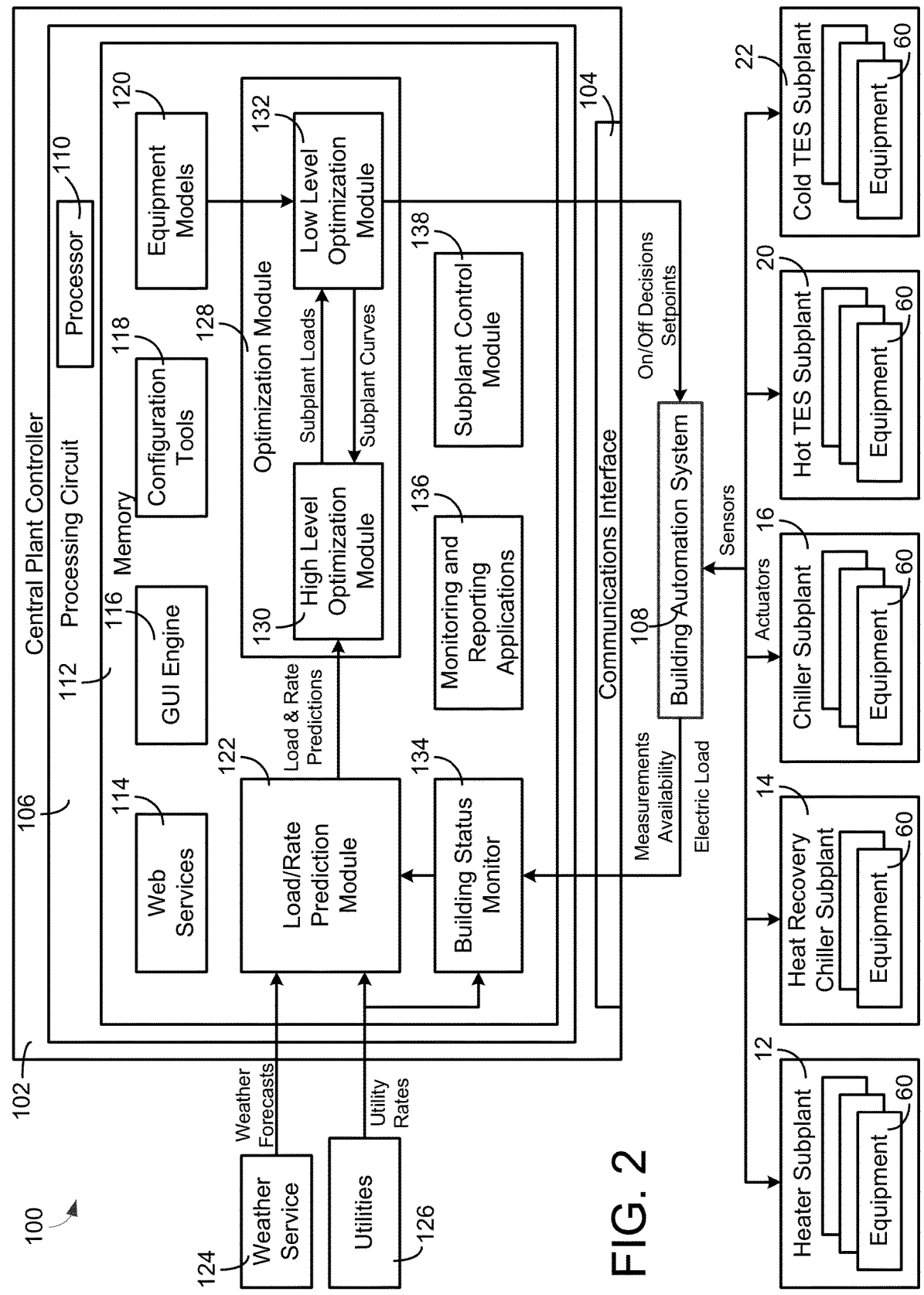
FIG. 2 is a block diagram of a central plant system including a central plant controller configured to generate on/off decisions and operating setpoints for equipment of the central plant of FIG. 1, according to an exemplary embodiment.

Referring now to FIG. 2, a block diagram illustrating a central plant system 100 is shown, according to an exemplary embodiment. System 100 is shown to include a central plant controller 102, a building automation system 108, and a plurality of subplants 12-22. Subplants 12-22 may be the same as previously described with reference to FIG. 1. For example, subplants 12-22 are shown to include a heater subplant 12, a heat recovery chiller subplant 14, a chiller subplant 16, a hot TES subplant 20, and a cold TES subplant 22.

Each of subplants 12-22 is shown to include equipment 60 that can be controlled by central plant controller 102 and/or building automation system 108 to optimize the performance of central plant 10. Equipment 60 may include, for example, heating devices 30, chillers 42, heat recovery heat exchangers 36, cooling towers 48, thermal energy storage devices 52-54, pumps 32, 34, 38, 44, 46, 50, valves, and/or other devices of subplants 12-22. Individual devices of equipment 60 can be turned on or off to adjust the thermal energy load served by each of subplants 12-22. In some embodiments, individual devices of equipment 60 can be operated at variable capacities (e.g., operating a chiller at 10% capacity or 60% capacity) according to an operating setpoint received from central plant controller 102.

In some embodiments, one or more of subplants 12-22 include a subplant level controller configured to control the equipment 60 of the corresponding subplant. For example, central plant controller 102 may determine an on/off configuration and global operating setpoints for equipment 60. In response to the on/off configuration and received global operating setpoints, the subplant controllers may turn individual devices of equipment 60 on or off, and implement specific operating setpoints (e.g., damper position, vane position, fan speed, pump speed, etc.) to reach or maintain the global operating setpoints.

Building automation system (BAS) 108 may be configured to monitor conditions within a controlled building. For example, BAS 108 may receive input from various sensors (e.g., temperature sensors, humidity sensors, airflow sensors, voltage sensors, etc.) distributed throughout the building and may report building conditions to central plant controller 102. Building conditions may include, for example, a temperature of the building or a zone of the building, a power consumption (e.g., electric load) of the building, a state of one or more actuators configured to affect a controlled state within the building, or other types of information relating to the controlled building. BAS 108 may operate subplants 12-22 to affect the monitored conditions within the building and to serve the thermal energy loads of the building.

BAS 108 may receive control signals from central plant controller 102 specifying on/off states and/or setpoints for equipment 60. BAS 108 may control equipment 60 (e.g., via actuators, power relays, etc.) in accordance with the control signals provided by central plant controller 102. For example, BAS 108 may operate equipment 60 using closed loop control to achieve the setpoints specified by central plant controller 102. In various embodiments, BAS 108 may be combined with central plant controller 102 or may be part of a separate building management system. According to an exemplary embodiment, BAS 108 is a METASYS® brand building management system, as sold by Johnson Controls, Inc.

Central plant controller 102 may monitor the status of the controlled building using information received from BAS 108. Central plant controller 102 may be configured to predict the thermal energy loads (e.g., heating loads, cooling loads, etc.) of the building for plurality of time steps in a prediction window (e.g., using weather forecasts from a weather service). Central plant controller 102 may generate on/off decisions and/or setpoints for equipment 60 to minimize the cost of energy consumed by subplants 12-22 to serve the predicted heating and/or cooling loads for the duration of the prediction window. According to an exemplary embodiment, central plant controller 102 is integrated within a single computer (e.g., one server, one housing, etc.). In various other exemplary embodiments, central plant controller 102 can be distributed across multiple servers or computers (e.g., that can exist in distributed locations). In another exemplary embodiment, central plant controller 102 may be integrated with a smart building manager that manages multiple building systems and/or combined with BAS 108.

Central plant controller 102 is shown to include a communications interface 104 and a processing circuit 106. Communications interface 104 may include wired or wireless interfaces (e.g., jacks, antennas, transmitters, receivers, transceivers, wire terminals, etc.) for conducting data communications with various systems, devices, or networks. For example, communications interface 104 may include an Ethernet card and port for sending and receiving data via an Ethernet-based communications network and/or a WiFi transceiver for communicating via a wireless communications network. Communications interface 104 may be configured to communicate via local area networks or wide area networks (e.g., the Internet, a building WAN, etc.) and may use a variety of communications protocols (e.g., BACnet, IP, LON, etc.).

Communications interface 104 may be a network interface configured to facilitate electronic data communications between central plant controller 102 and various external systems or devices (e.g., BAS 108, subplants 12-22, etc.). For example, central plant controller 102 may receive information from BAS 108 indicating one or more measured states of the controlled building (e.g., temperature, humidity, electric loads, etc.) and one or more states of subplants 12-22 (e.g., equipment status, power consumption, equipment availability, etc.). Communications interface 104 may receive inputs from BAS 108 and/or subplants 12-22 and may provide operating parameters (e.g., on/off decisions, setpoints, etc.) to subplants 12-22 via BAS 108. The operating parameters may cause subplants 12-22 to activate, deactivate, or adjust a setpoint for various devices of equipment 60.

Still referring to FIG. 2, processing circuit 106 is shown to include a processor 110 and memory 112. Processor 110 may be a general purpose or specific purpose processor, an application specific integrated circuit (ASIC), one or more field programmable gate arrays (FPGAs), a group of processing components, or other suitable processing components. Processor 110 may be configured to execute computer code or instructions stored in memory 112 or received from other computer readable media (e.g., CDROM, network storage, a remote server, etc.).

Memory 112 may include one or more devices (e.g., memory units, memory devices, storage devices, etc.) for storing data and/or computer code for completing and/or facilitating the various processes described in the present disclosure. Memory 112 may include random access memory (RAM), read-only memory (ROM), hard drive storage, temporary storage, non-volatile memory, flash memory, optical memory, or any other suitable memory for storing software objects and/or computer instructions. Memory 112 may include database components, object code components, script components, or any other type of information structure for supporting the various activities and information structures described in the present disclosure. Memory 112 may be communicably connected to processor 110 via processing circuit 106 and may include computer code for executing (e.g., by processor 110) one or more processes described herein.

Still referring to FIG. 2, memory 112 is shown to include a building status monitor 134. Central plant controller 102 may receive data regarding the overall building or building space to be heated or cooled with central plant 10 via building status monitor 134. In an exemplary embodiment, building status monitor 134 may include a graphical user interface component configured to provide graphical user interfaces to a user for selecting building requirements (e.g., overall temperature parameters, selecting schedules for the building, selecting different temperature levels for different building zones, etc.).

Central plant controller 102 may determine on/off configurations and operating setpoints to satisfy the building requirements received from building status monitor 134. In some embodiments, building status monitor 134 receives, collects, stores, and/or transmits cooling load requirements, building temperature setpoints, occupancy data, weather data, energy data, schedule data, and other building parameters. In some embodiments, building status monitor 134 stores data regarding energy costs, such as pricing information available from utilities 126 (energy charge, demand charge, etc.).

Still referring to FIG. 2, memory 112 is shown to include a load/rate prediction module 122. Load/rate prediction module 122 may be configured to predict the thermal energy loads ($\hat{l}_k$) of the building or campus for each time step k (e.g., k=1 n) of a prediction period. Load/rate prediction module 122 is shown receiving weather forecasts from a weather service 124. In some embodiments, load/rate prediction module 122 predicts the thermal energy loads $\hat{l}_k$ as a function of the weather forecasts. In some embodiments, load/rate prediction module 122 uses feedback from BAS 108 to predict loads 4. Feedback from BAS 108 may include various types of sensory inputs (e.g., temperature, flow, humidity, enthalpy, etc.) or other data relating to the controlled building (e.g., inputs from a HVAC system, a lighting control system, a security system, a water system, etc.).

In some embodiments, load/rate prediction module 122 receives a measured electric load and/or previous measured load data from BAS 108 (e.g., via building status monitor 134). Load/rate prediction module 122 may predict loads $\hat{l}_k$ as a function of a given weather forecast ($\hat{\phi}_w$), a day type (day), the time of day (t), and previous measured load data ($Y_{k-1}$). Such a relationship is expressed in the following equation:

$$\hat{l}_k = f(\hat{\phi}_w, \text{day}, t | Y_{k-1}).$$

In some embodiments, load/rate prediction module 122 uses a deterministic plus stochastic model trained from historical load data to predict loads $\hat{l}_k$. Load/rate prediction module 122 may use any of a variety of prediction methods to predict loads $\hat{l}_k$ (e.g., linear regression for the deterministic portion and an AR model for the stochastic portion).

Load/rate prediction module 122 is shown receiving utility rates from utilities 126. Utility rates may indicate a cost or price per unit of a resource (e.g., electricity, natural gas, water, etc.) provided by utilities 126 at each time step k in the prediction window. In some embodiments, the utility rates are time-variable rates. For example, the price of electricity may be higher at certain times of day or days of the week (e.g., during high demand periods) and lower at other times of day or days of the week (e.g., during low demand periods). The utility rates may define various time periods and a cost per unit of a resource during each time period. Utility rates may be actual rates received from utilities 126 or predicted utility rates estimated by load/rate prediction module 122.

In some embodiments, the utility rates include demand charge rates for one or more resources provided by utilities 126. A demand charge may define a separate cost imposed by utilities 126 based on the maximum usage of a particular resource (e.g., maximum energy consumption) during a demand charge period. The utility rates may define various demand charge periods and one or more demand charges associated with each demand charge period. In some instances, demand charge periods may overlap partially or completely with each other and/or with the prediction window. Advantageously, optimization module 128 may be configured to account for demand charges in the high level optimization process performed by high level optimization module 130.

Load/rate prediction module 122 may store the predicted loads $\hat{l}_k$ and the utility rates in memory 112 and/or provide the predicted loads $\hat{l}_k$ and the utility rates to optimization module 128. Optimization module 128 may use the predicted loads $\hat{l}_k$ and the utility rates to determine an optimal load distribution for subplants 12-22 and to generate on/off decisions and setpoints for equipment 60.

Still referring to FIG. 2, memory 112 is shown to include an optimization module 128. Optimization module 128 may perform a cascaded optimization process to optimize the performance of central plant 10. For example, optimization module 128 is shown to include a high level optimization module 130 and a low level optimization module 132. High level optimization module 130 may determine how to distribute thermal energy loads across subplants 12-22 for each time step in the prediction window in order to minimize the cost of energy consumed by subplants 12-22. Low level optimization module 132 may determine how to best run each subplant at the load setpoint determined by high level optimization module 130.

Advantageously, the cascaded optimization process performed by optimization module 128 allows the optimization process to be performed in a time-efficient manner. The low level optimization may use a relatively short time horizon or no time horizon at all due to the fast system dynamics compared to the time to re-optimize plant loads. The high level optimization may use a relatively longer time horizon when the dynamics and capacity of the thermal energy storage allow loads to be deferred for long time periods.

Low level optimization module 132 may generate and provide subplant power curves to high level optimization module 130. The subplant power curves may indicate the rate of utility use by each of subplants 12-22 (e.g., measured in units of power such as kW) as a function of the load served by the subplant. In some embodiments, low level optimization module 132 generates the subplant power curves based on equipment models 120 (e.g., by combining equipment models 120 for individual devices into an aggregate power curve for the subplant). Low level optimization module 132 may generate the subplant power curves by running the low level optimization process for several different loads and weather conditions to generate multiple data points ($\dot{Q}_{subplant}$, kW). Low level optimization module 132 may fit a curve to the data points to generate the subplant power curves.

High level optimization module 130 may receive the load and rate predictions from load/rate prediction module 122 and the subplant power curves from low level optimization module 132. High level optimization module 130 may determine the optimal load distribution for subplants 12-22 (e.g., $\dot{Q}_{subplant}$ for each subplant) over the prediction window and provide the optimal load distribution to low level optimization module 132. In some embodiments, high level optimization module 130 determines the optimal load distribution by minimizing the total operating cost of central plant 10 over the prediction window. In other words, given a predicted load $\hat{l}_k$ and utility rate information from load/rate prediction module 122, high level optimization module 130 may distribute the predicted load $\hat{l}_k$ across subplants 12-22 to minimize cost.

In some instances, the optimal load distribution may include using TES subplants 20 and/or 22 to store thermal energy during a first time step for a later time step. Thermal energy storage may advantageously allow thermal energy to be produced and stored during a first time period when energy prices are relatively low and subsequently retrieved and used during a second time period when energy proves are relatively high. The high level optimization may be different from the low level optimization in that the high level optimization has a longer time constant due to the thermal energy storage provided by TES subplants 20-22. The high level optimization may be described by the following equation:

$$\theta^*_{HL} = \underset{\theta_{HL}}{\mathrm{argmin}} J_{HL}(\theta_{HL})$$

where $\theta^*_{HL}$ contains the optimal high level decisions (e.g., the optimal load $\dot{Q}$ for each of subplants 12-22) for the entire prediction period and $J_{HL}$ is the high level cost function.

To find the optimal high level decisions $\theta^*_{LL}$, high level optimization module 130 may minimize the high level cost function $J_{HL}$. The high level cost function $J_{HL}$ may be the sum of the economic costs of each utility consumed by each of subplants 12-22 for the duration of the prediction period. For example, the high level cost function $J_{HL}$ may be described using the following equation:

$$J_{HL}(\theta_{HL}) = \sum_{k=1}^{n_h} \sum_{i=1}^{n_s} \left[ \sum_{j=1}^{n_u} t_s \cdot c_{jk} u_{jik}(\theta_{HL}) \right]$$

where $n_h$ is the number of time steps k in the prediction period, $n_s$ is the number of subplants, $t_s$ is the duration of a time step, $c_{jk}$ is the economic cost of utility j at a time step k of the prediction period, and $u_{jik}$ is the rate of use of utility j by subplant i at time step k. In some embodiments, the cost function $J_{HL}$ includes an additional demand charge term such as:

$$w_d c_{demand} \underset{n_h}{\max}(u_{elec}(\theta_{HL}), u_{max,elec})$$

where $w_d$ is a weighting term, $c_{demand}$ is the demand cost, and the max( ) term selects the peak electricity use during the applicable demand charge period.

In some embodiments, the high level optimization performed by high level optimization module 130 is the same or similar to the high level optimization process described in U.S. patent application Ser. No. 14/634,609 titled "High Level Central Plant Optimization" and filed on the same day as the present application. The entire disclosure of U.S. patent application Ser. No. 14/634,609 is incorporated by reference herein.

In some embodiments, high level optimization module 130 provides the optimal load distribution for each time step to low level optimization module 132 at the beginning of the time step. The optimal load distributions for subsequent time steps may be updated by high level optimization module 130 and provided to low level optimization module 132 at the beginning of subsequent time steps.

Low level optimization module 132 may use the subplant loads determined by high level optimization module 130 to determine optimal low level decisions $\theta^*_{LL}$ (e.g. binary on/off decisions, flow setpoints, temperature setpoints, etc.) for equipment 60. The low level optimization process may be performed for each of subplants 12-22. Low level optimization module 132 may be responsible for determining which devices of each subplant to use and the setpoints for such devices that will achieve the subplant load setpoint while minimizing energy consumption. The low level optimization may be described using the following equation:

$$\theta^*_{LL} = \underset{\theta_{LL}}{\mathrm{argmin}} J_{LL}(\theta_{LL})$$

where $\theta^*_{LL}$ contains the optimal low level decisions and $J_{LL}$ is the low level cost function.

To find the optimal low level decisions $\theta^*_{LL}$, low level optimization module 132 may minimize the low level cost function $J_{LL}$. The low level cost function $J_{LL}$ may represent the total energy consumption for all of the devices of equipment 60 in the applicable subplant. The lower level cost function $J_{LL}$ may be described using the following equation:

$$J_{LL}(\theta_{LL}) = \sum_{j=1}^{N} t_s \cdot b_j \cdot u_j(\theta_{LL})$$

where N is the number of devices of equipment 60 in the subplant, $t_s$ is the duration of a time step, $b_j$ is a binary on/off decision (e.g., 0=off, 1=on), and $u_j$ is the energy used by device j as a function of the setpoint $\theta_{LL}$. Each device may have continuous variables which can be changed to determine the lowest possible energy consumption for the overall input conditions.

Low level optimization module 132 may minimize the low level cost function $J_{LL}$ subject to inequality constraints based on the capacities of equipment 60 and equality constraints based on energy and mass balances. In some embodiments, the optimal low level decisions $\theta^*_{LL}$ are constrained by switching constraints defining a short horizon for maintaining a device in an on or off state after a binary on/off switch. The switching constraints may prevent devices from being rapidly cycled on and off. In some embodiments, low level optimization module 132 performs the equipment level optimization without considering system dynamics. The optimization process may be slow enough to safely assume that the equipment control has reached its steady-state. Thus, low level optimization module 132 may determine the optimal low level decisions $\theta^*_{LL}$ at an instance of time rather than over a long horizon.

Low level optimization module 132 may determine optimum operating statuses (e.g., on or off) for a plurality of devices of equipment 60. Low level optimization module 132 may store code executable by processor 110 to execute operations as subsequently described in this application, including binary optimization operations and/or quadratic compensation operations. According to an exemplary embodiment, the on/off combinations may be determined using binary optimization and quadratic compensation. Binary optimization may minimize a cost function representing the power consumption of devices in the applicable subplant. In some embodiments, non-exhaustive (i.e., not all potential combinations of devices are considered) binary optimization is used. Quadratic compensation may be used in considering devices whose power consumption is quadratic (and not linear). Low level optimization module 132 may also determine optimum operating setpoints for equipment using nonlinear optimization. Nonlinear optimization may identify operating setpoints that further minimize the low level cost function $J_{LL}$. Low level optimization module 132 is described in greater detail with reference to FIG. 3.

Still referring to FIG. 2, memory 112 is shown to include a subplant control module 138. Subplant control module 138 may store historical data regarding past operating statuses, past operating setpoints, and instructions for calculating and/or implementing control parameters for subplants 12-22. Subplant control module 138 may also receive, store, and/or transmit data regarding the conditions of individual devices of equipment 60, such as operating efficiency, equipment degradation, a date since last service, a lifespan parameter, a condition grade, or other device-specific data. Subplant control module 138 may receive data from subplants 12-22 and/or BAS 108 via communications interface 104. Subplant control module 138 may also receive and store on/off statuses and operating setpoints from low level optimization module 132.

Data and processing results from optimization module 128, subplant control module 138, or other modules of central plant controller 102 may be accessed by (or pushed to) monitoring and reporting applications 136. Monitoring and reporting applications 136 may be configured to generate real time "system health" dashboards that can be viewed and navigated by a user (e.g., a central plant engineer). For example, monitoring and reporting applications 136 may include a web-based monitoring application with several graphical user interface (GUI) elements (e.g., widgets, dashboard controls, windows, etc.) for displaying key performance indicators (KPI) or other information to users of a GUI. In addition, the GUI elements may summarize relative energy use and intensity across central plants in different buildings (real or modeled), different campuses, or the like. Other GUI elements or reports may be generated and shown based on available data that allow users to assess performance across one or more central plants from one screen. The user interface or report (or underlying data engine) may be configured to aggregate and categorize operating conditions by building, building type, equipment type, and the like. The GUI elements may include charts or histograms that allow the user to visually analyze the operating parameters and power consumption for the devices of a chilled water system.

Still referring to FIG. 2, central plant controller 102 may include one or more GUI servers, web services 114, or GUI engines 116 to support monitoring and reporting applications 136. In various embodiments, applications 136, web services 114, and GUI engine 116 may be provided as separate components outside of central plant controller 102 (e.g., as part of a smart building manager). Central plant controller 102 may be configured to maintain detailed historical databases (e.g., relational databases, XML databases, etc.) of relevant data and includes computer code modules that continuously, frequently, or infrequently query, aggregate, transform, search, or otherwise process the data maintained in the detailed databases. Central plant controller 102 may be configured to provide the results of any such processing to other databases, tables, XML files, or other data structures for further querying, calculation, or access by, for example, external monitoring and reporting applications.

Central plant controller 102 is shown to include configuration tools 118. Configuration tools 118 can allow a user to define (e.g., via graphical user interfaces, via prompt-driven "wizards," etc.) how central plant controller 102 should react to changing conditions in the central plant subsystems. In an exemplary embodiment, configuration tools 118 allow a user to build and store condition-response scenarios that can cross multiple central plant devices, multiple building systems, and multiple enterprise control applications (e.g., work order management system applications, entity resource planning applications, etc.). For example, configuration tools 118 can provide the user with the ability to combine data (e.g., from subsystems, from event histories) using a variety of conditional logic. In varying exemplary embodiments, the conditional logic can range from simple logical operators between conditions (e.g., AND, OR, XOR, etc.) to pseudo-code constructs or complex programming language functions (allowing for more complex interactions, conditional statements, loops, etc.). Configuration tools 118 can present user interfaces for building such conditional logic. The user interfaces may allow users to define policies and responses graphically. In some embodiments, the user interfaces may allow a user to select a pre-stored or pre-constructed policy and adapt it or enable it for use with their system.

Figure 3:
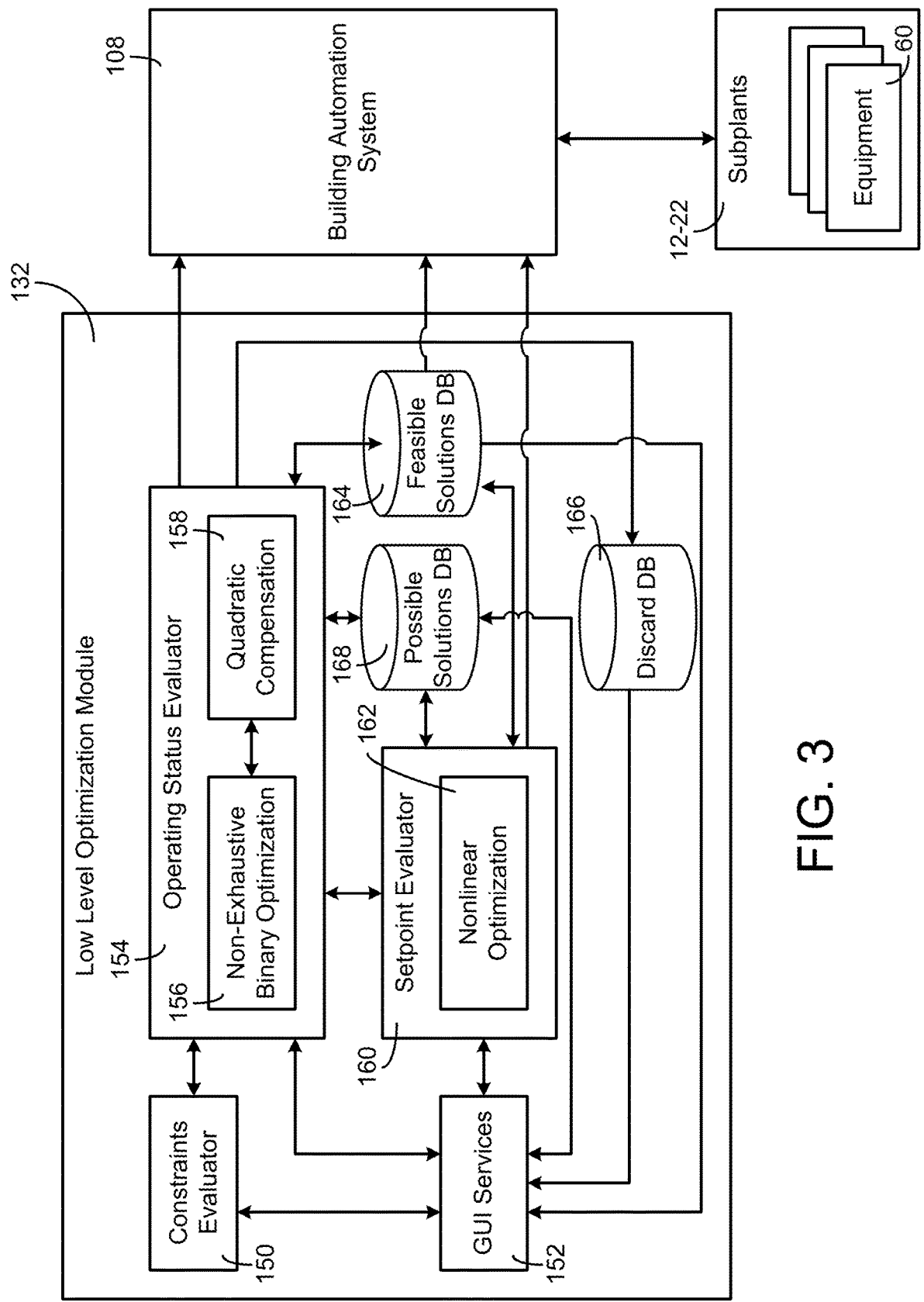
FIG. 3 is a block diagram illustrating a low level optimization module of the central plant controller of FIG. 2 in greater detail, according to an exemplary embodiment.

Referring now to FIG. 3, a block diagram illustrating low level optimization module 132 in greater detail is shown, according to an exemplary embodiment. Low level optimization module 132 may store computer code (e.g., a set of executable computer code instructions stored in non-transitory computer-readable media) that is executable by processor 110. Low level optimization module 132 may be configured to generate and output operating status commands and setpoints for equipment 60 via, e.g., communications interface 104. The operating status commands (e.g., on/off) and setpoints output to the equipment 60 of a particular subplant may be estimated (e.g., by low level optimization module 132) to minimize the power consumption of the subplant.

Low level optimization module 132 is shown to include an operating status evaluator 154. Operating status evaluator 154 may examine a plurality of potential device on/off combinations to select a combination for use by central plant 10. For example, if chiller subplant 16 has four chillers (i.e., chiller 1, chiller 2, chiller 3, and chiller 4), a potential on/off combination may be [1, 0, 0, 1] indicating that chiller 1 is on, chiller 2 is off, chiller 3 is off, and chiller 4 is on. In some instances, the operating status of a particular device may be unspecified (e.g., corresponding to a node that has not yet been evaluated) and may be represented with a question mark. For example, the combination [1, 0, ?, ?] may indicate that chiller 1 is on, chiller 2 is off, and chillers 3-4 have an unspecified operating status. An unspecified operating status does not necessarily indicate that the operating status is unknown, but rather that the operating status for the corresponding device has not yet been evaluated and is not fixed by the combination. For example, the combination [1, 0, 0, ?] fixes the operating status of chiller 1, chiller 2, and chiller 3, but indicates that it is possible for chiller 4 to be either on or off and still satisfy the combination. In an exemplary embodiment, operating status evaluator 154 uses non-exhaustive binary optimization and quadratic compensation to determine which combination of on/off states to select for use. Modules 156 and 158 (described in greater detail below) provide instructions for implementing the non-exhaustive binary optimization and quadratic compensation, respectively.

Low level optimization module 132 is shown to include possible solutions database 168, a feasible solution database 164, and discard database 166. Possible solutions database 168 may contain on/off combinations that are estimated to be capable of satisfying the thermal energy load and the optimization constraints for the subplant. A combination may be stored in possible solutions database if the combination can potentially satisfy all of the applicable constraints (e.g., subplant load constraints, device capacity constraints, etc.), considering any unspecified operating statuses as wildcards. For example, if the combination [1, 1, 0, 1] satisfies the constraints but the combination [1, 1, 0, 0] does not, the combination [1, 1, 0, ?] would satisfy the constraints because the unspecified operating status can be either on (1) or off (0). Possible solutions database 168 stores possible combinations (i.e., combinations that satisfy plant load requirements and system constraints) that may or may not result in the lowest power consumption.

Discard database 166 may contain combinations currently known or estimated to be unable to satisfy subplant load and/or system constraint requirements. Discard database 166 may store infeasible combinations of devices (i.e., combinations that cannot possibly satisfy plant load requirements and/or system constraints) regardless of the operating statuses of any devices with an unspecified operating status. For example, if both of the combinations [1, 1, 0, 1] and [1, 1, 0, 0] fail to satisfy the constraints, the combination [1, 1, 0, ?] would also fail to satisfy the constraints because no value of the unspecified operating status would cause the combination to satisfy the constraints.

Feasible solutions database 164 may contain potential combinations that are capable of satisfying the subplant load and system constraint requirements, and additionally do so with a minimum energy consumption. In some embodiments, feasible solutions database 164 stores the optimal combination of on/off statuses (i.e., the combination that results in the minimum energy consumption). In some embodiments, feasible solutions database 164 stores combinations that satisfy all applicable constraints, regardless of the value of any unspecified operating status. For example, if both of the combinations [1, 1, 0, 1] and [1, 1, 0, 0] satisfy the constraints, the combination [1, 1, 0, ?] may be stored as a feasible combination because any value of the unspecified operating status would cause the combination to satisfy the constraints. Databases 164, 166, and 168 may store the potential combinations in any suitable data structure or data structures, including linked lists, trees, arrays, relational database structures, object-based structures, or other data structures.

Operating status evaluator 154 may receive possible combinations of on/off statuses from possible solutions database 168. Operating status evaluator 154 may evaluate the combinations in possible solutions database 168 in view of the currently applicable constraints (e.g., subplant load, device capacities, etc.) and store various combinations in possible solutions database 168, feasible solutions database 164, and/or discard database 166 based on a result of the evaluation. In some embodiments, operating status evaluator 154 periodically evaluates new combinations (e.g., those which have not recently been evaluated as a potentially optimal solution) from feasible solutions database 164 and/or discard database 166 for further evaluation. Moreover, as new devices are brought online, such new devices and new combinations including the new devices can be added to feasible solutions database 164 for consideration by operating status evaluator 154.

Operating status evaluator 154 may receive constraints on the low level optimization process from constraints evaluator 150. Constraints may include, for example, maximum device capacities, energy or mass balance constraints, minimum device capacities, etc. The constraints may establish minimum and/or maximum parameters for equipment 60. In some embodiments, the constraints are automatically generated quantities based on, e.g., historical data. In other embodiments, an operator of the central plant system may set and/or modify the constraints. The constraints include, for example, that each device of the subplant system operates with a minimum load (such as 30%). This requirement may advantageously ensure that power is being consumed efficiently (i.e., the work done by the device is sufficient to justify the power required to operate the device). The constraints may also include that the total power of the chiller plant be less than a maximum. This requirement may advantageously prevent the subplant from becoming overloaded.

Operating status evaluator 154 may use the constraints to identify feasible on/off configurations. Operating status evaluator 154 may provide a potential on/off combination to constraint evaluator 150, which may be configured to check the potential combination relative to the current constraints. If a potential combination cannot meet the current constraints, operating status evaluator 154 may move the potential combination to discard database 166 and/or remove the potential combination from feasible solutions database 164.

Still referring to FIG. 3, operating status evaluator 154 is shown to include a non-exhaustive binary optimization module 156 and a quadratic compensation module 158. Binary optimization module 156 may include computer code instructions for optimizing (e.g., minimizing) the low level cost function $J_{LL}$ representing the energy consumption of a subplant. According to an exemplary embodiment, binary optimization module 156 uses a branch and bound method to perform the binary optimization. In some embodiments, binary optimization module 156 executes the branch and bound method such that not all of the possible combinations of equipment 50 are considered in any given situation. This may advantageously reduce computation time required by operating status evaluator 154.

Quadratic compensation module 158 may include computer code instructions configured to compensate for the nonlinear nature of the system. For example, quadratic compensation module 158 may account for the power consumption of some devices of equipment 60 having a quadratic form (i.e., not a linear form). Quadratic compensation module 158 may be selectively utilized when the power consumption of the devices being considered by operating status evaluator 154 is quadratic.

Quadratic compensation module 158 may advantageously account for the fact that the binary optimization performed by non-exhaustive binary optimization module 156 is intended for a linear system, but the power consumption of a particular device is a quadratic function. For example, in a purely linear system, binary optimization will typically return the fewest devices required to meet plant load. If turning two devices on will meet the plant load, then other combinations may not be considered, even if the power consumption of other combinations is lower. In an exemplary embodiment, however, alternative embodiments are identified and then compared using the assistance of quadratic compensation module 158 (or another nonlinear compensation).

Because chiller power is not linear, quadratic compensation may be conducted on every device having a nonlinear or quadratic power curve, advantageously checking for whether the lowest power combination of devices is achieved by adding another device. For example, binary optimization module 156 may identify a combination of devices that meets plant load (e.g., two devices on). The binary search may continue by looking ahead to a combination with the next device activated rather than deactivated. For example, even if two devices turned on would meet a plant load, the binary search may use each device's quadratic power curve to consider the expected power change with three devices turned on. The power consumption per device may decrease as additional devices are turned on because one or more of the devices may operate more efficiently at a lower capacity than a higher capacity. The net power consumption may therefore decrease as a result. If three devices on results in lower power, then it is a more optimal solution than two devices on. On the other hand, despite efficiencies gained in the original "on" devices by turning another device on, the overhead energy consumption added by turning on the additional device may result in a determination that the additional device should not be turned on.

Still referring to FIG. 3, low level optimization module 132 is shown to include a setpoint evaluator 160. Setpoint evaluator 160 may be configured to examine one or more combinations of active (e.g., "on") devices to determine optimal operating setpoints. The optimal operating setpoints may be estimated to minimize power consumption while achieving the subplant load setpoint and satisfying other constraints on the low level optimization process. According to an exemplary embodiment, setpoint evaluator 160 estimates the optimal temperature setpoints (e.g., hot water temperature setpoint, condenser water temperature setpoint, chilled water temperature setpoint, etc.), flow rate setpoints (e.g., flow rates through individual heating elements 30, chillers 42, heat recovery chillers 36, cooling towers 48, etc.), and/or pressure setpoints (e.g., hot water differential pressure, chilled water differential pressure, etc.) for a given combination of active devices of equipment 60. In other embodiments, more, fewer, or different setpoints may be determined.

Setpoint evaluator 160 may receive one or more potential on/off combinations from operating status evaluator 154 and/or possible solutions database 168. Setpoint evaluator 160 may move potential combinations to discard database 166 when the combinations are determined to be infeasible or when a potential combination is repeatedly identified as not being efficient relative to other solutions. In certain situations, setpoint evaluator 160 may also move potential combinations to feasible solutions database 164 (e.g., when a combination is estimated to minimize power consumption compared to other combinations).

Still referring to FIG. 3, setpoint evaluator 160 is shown to include a nonlinear optimization module 162. Nonlinear optimization module 162 may include computer code for optimizing (e.g., minimizing) the low level cost function $J_{LL}$ for a set of active central plant devices (e.g., devices that are "on"). The operating status (e.g., on/off) of the devices may have been previously determined using operating status evaluator 154. According to various embodiments, nonlinear optimization module 162 performs a nonlinear optimization using direct or indirect search methods. For example, nonlinear optimization module 162 may use a Nelder-Mead or downhill simplex method, Generalized Reduced Gradient (GRG), Sequential Quadratic Programming (SQP), Steepest Descent (Cauchy Method), Conjugate Gradient (Fletcher-Reeves Method), or other nonlinear optimization methods.

Low level optimization module 132 is shown to include GUI services 152. GUI services 152 may be configured to generate graphical user interfaces for central plant controller 102 or another server to provide to a user output device (e.g., a display, a mobile phone, a client computer, etc.). The graphical user interfaces may present or explain the active combination of devices, system efficiencies, system setpoints, system constraints, or other system information. GUI services 152 may facilitate a user's (e.g., a central plant engineer's) ability to track energy usage and operating statuses of the central plant devices via, e.g., a web-based monitoring application. GUI services 152 may additionally allow a user to manually set and update system constraints, available devices, certain thresholds (e.g., for moving a combination to a discard set) optimum off/on operating statuses, and optimum operating setpoints.

Figure 4:
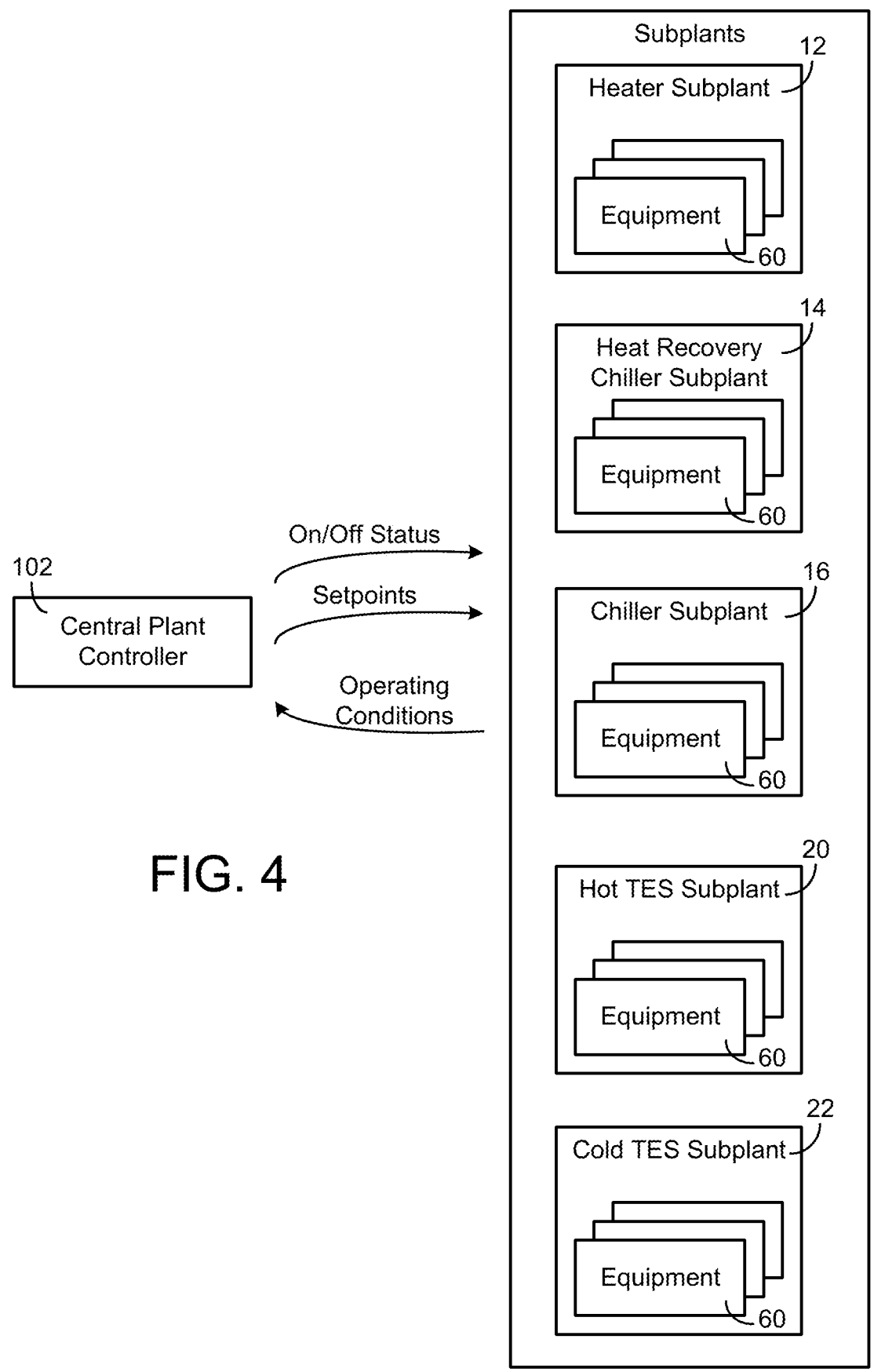
FIG. 4 is a block diagram illustrating the central plant controller of FIG. 2 receiving operating conditions from the plurality of subplants of FIG. 1 and providing generated on/off statuses and operating setpoints as operating commands for the central plant equipment, according to an exemplary embodiment.

Referring now to FIG. 4, a block diagram illustrating central plant controller 102 and subplants 12-22 is shown, according to an exemplary embodiment. Central plant controller 102 is configured to transmit determined on/off statuses and operating setpoints to subplants 12-22 and/or the equipment 60 within each subplant. Communication between central plant controller 102 and equipment 60 may be direct (as shown in FIG. 4) or via one or more intermediaries (e.g., BAS 108, subplant level controllers, etc.). Central plant controller 102 and subplants 12-22 may transmit and receive data automatically, without a user's intervention. In other embodiments, a user may additionally provide manual inputs or approvals to central plant controller 102 and/or subplants 12-22.

The number of active devices of equipment 60 within each subplant may depend on the load on the subplant. In some embodiments, equipment 60 may be coupled to a local controller that receives and implements the operating statuses and setpoints from central plant controller 102. The local controller may be configured to transmit operating conditions about equipment 60 back to central plant controller 102. For example, a local controller for a particular device may report or confirm current operating status (on/off), current operating load, device energy consumption, device on/run time, device operating efficiency, failure status, or other information back to central plant controller 102 for processing or storage. The performance of equipment 60 may be evaluated using a coefficient of performance (COP), a power consumption per plant load (KW/ton) value, or another value indicative of power efficiency or consumption.

Figure 5:
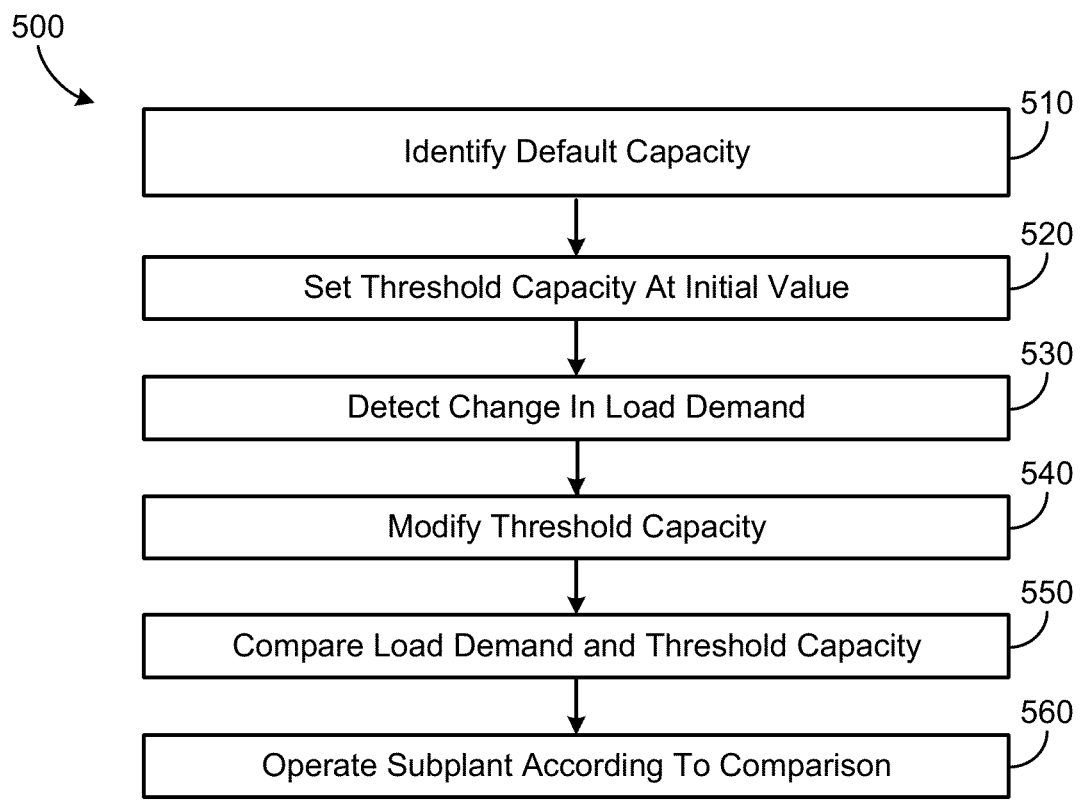
FIG. 5 is a flowchart illustrating a process for delaying change of operating state of a device within a subplant by modifying an adjusted capacity for the device, according to an exemplary embodiment.

FIG. 5 is a flowchart illustrating a process 500 of delaying plant control, according to an exemplary embodiment. The process 500 may be performed by the central plant controller 102 of FIG. 2 (e.g., low level optimization module 132 of FIGS. 2 and 3). In other embodiments, the process 500 may be performed by other entities. In other embodiments, the process 500 includes more, fewer, or different steps than shown in FIG. 5.

The central plant controller 102 identifies a base capacity of one or more devices of a group of central plant equipment (Step 510). A group of central plant equipment may include multiple devices (e.g., heaters, chillers, heat recovery chillers, cooling towers, or other types of equipment). An adjusted capacity (also may be referred to as "a threshold capacity") is a threshold compared against requested load (also may be referred to as "load demand") to determine an operating state of one or more devices of the group of central plant equipment. A base capacity (also referred to as "a default capacity" or "an actual capacity") is a reference capacity, based on which the adjusted capacity is determined or modified. In one aspect, the base capacity is predetermined by an operating engineer of the central plant 10, or a manufacturer of one or more devices of the group of central plant equipment. The central plant controller 102 may store a look up table indicating base capacities and associated devices before or during operation of the central plant. The central plant controller 102 may refer to the look up table to identify a base capacity of one or more associated devices.

The central plant controller 102 sets the adjusted capacity of the one or more devices at an initial value according to the base capacity (Step 520). The central plant controller 102 may determine the initial value of the adjusted capacity of the device by multiplying the base capacity by a predetermined percentage (e.g., 110% or 90%) or adding a predetermined amount (either a positive amount or a negative amount) to the base capacity.

The central plant controller 102 detects a change in requested load demand of the one or more devices (Step 530). The change in the requested load may occur at a crossover time. A crossover time herein refers to a time, at which the requested load crosses the base capacity. For example, requested load initially below the base capacity exceeds the base capacity at the crossover time, or the requested load initially above the base capacity drops below the base capacity.

In response to detecting the requested load crossing the base capacity, the central plant controller 102 may modify, change, or decay the adjusted capacity using a decay function (Step 540). For example, if the requested load initially above the base capacity, crosses the base capacity (e.g., drops below the base capacity), the central plant controller 102 may increase the adjusted capacity from its initial value toward the base capacity. For another example, if the requested load initially below the base capacity, crosses the base capacity (e.g., increases above the base capacity), the central plant controller 102 may decrease the adjusted capacity from its initial value toward the base capacity. The central plant controller 102 may decay the adjusted capacity to reach the base capacity in a time period T (also referred to as "a decay period" herein). The central plant controller 102 may decay the adjusted capacity linearly, or non-linearly. In one approach, the central plant controller 102 sets the adjusted capacity as below:

$$C_{Eff} = C_{Act}\left(\frac{\max[(\tau - (t_{Now} - t_{Crossover})), 0]}{\tau}\alpha + 1\right)$$

where $C_{Act}$ is a base capacity; $C_{Eff}$ is the adjusted capacity; a is a coefficient indicating desired capacity adjustment as a percentage; $\tau$ represents the period of the change (or decay period), for example, in minutes; $t_{Now}$ is current time; and $t_{crossover}$ is the crossover time. If no change in the requested load is detected, $t_{crossover}$ may be $t_{Now}$.

The central plant controller 102 compares the requested load and the decaying adjusted capacity (Step 550). The central plant controller 102 operates the central plant according to the comparison (Step 560). In one approach, if the requested load crosses the adjusted capacity, then the central plant controller 102 changes operation of one or more devices of the group of central plant equipment. Conversely, if the requested load does not cross the adjusted capacity, then the central plant controller 102 may maintain existing operation of the one or more devices of the group of central plant equipment without change. For example, a device may turn off or operate in a first state, in response to the requested load of the device not exceeding the adjusted capacity. For another example, a device may turn on or operate in a second state, in response to the requested load exceeding the adjusted capacity. Additional examples of the operation of the central plant controller 102 are provided below with respect to FIGS. 6A through 6C.

Figure 6A:
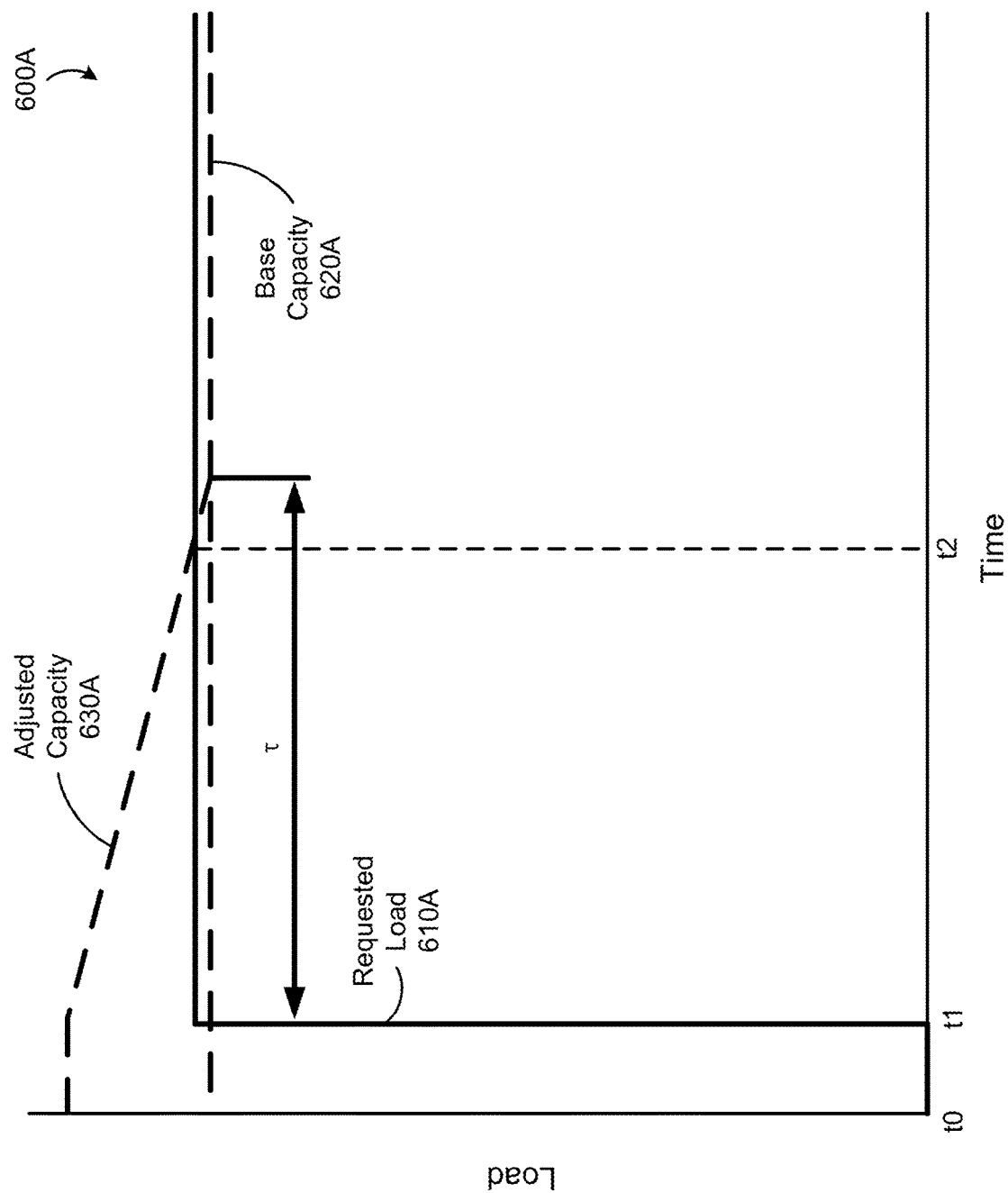
FIG. 6A is a timing diagram illustrating the adjusted capacity above the base capacity of the device decreasing toward the base capacity after the change in requested load occurs, according to an exemplary embodiment.

FIG. 6A is a timing diagram 600A illustrating delaying cycling on (or enabling) one or more devices, according to an exemplary embodiment. The timing diagram 600A includes plots 610A, 620A, 630A. Plot 610A represents requested load of one or more devices of a group of central plant equipment. Plot 620A represents a base capacity of the one or more devices of the group of central plant equipment. Plot 630A represents an adjusted capacity of the one or more devices of the group of central plant equipment. As shown in FIG. 6A, the requested load is below the base capacity at time t0. At time t0, the adjusted capacity is set at an initial value, which is, for example, 20% above the base capacity.

At time t1, the requested load changes to exceed the base capacity. In response to detecting that the requested load exceeds the base capacity, the central plant controller 102 decays the adjusted capacity as represented by the plot 630A. The central plant controller 102 may linearly decay the adjusted capacity for the time period $\tau$, until the adjusted capacity reaches the base capacity as represented by the plot 620A.

While the adjusted capacity is decaying (e.g., decreasing) during the decay period $\tau$ or after the adjusted capacity is changed to the base capacity, the central plant controller 102 compares the adjusted capacity and the requested load. In FIG. 6A, the central plant controller 102 detects that the requested load exceeds the decaying adjusted capacity at time t2. In response to detecting that the requested load exceeds the adjusted capacity at time t2, the central plant controller 102 enables a device of the one or more devices of the group of central plant equipment. Accordingly, enabling the device of the one or more devices is delayed by a time period (e.g., t2-t1). If the requested load had not crossed the adjusted capacity, the central plant controller 102 would not enable the device. Hence, short cycling of the device can be avoided.

Figure 6B:
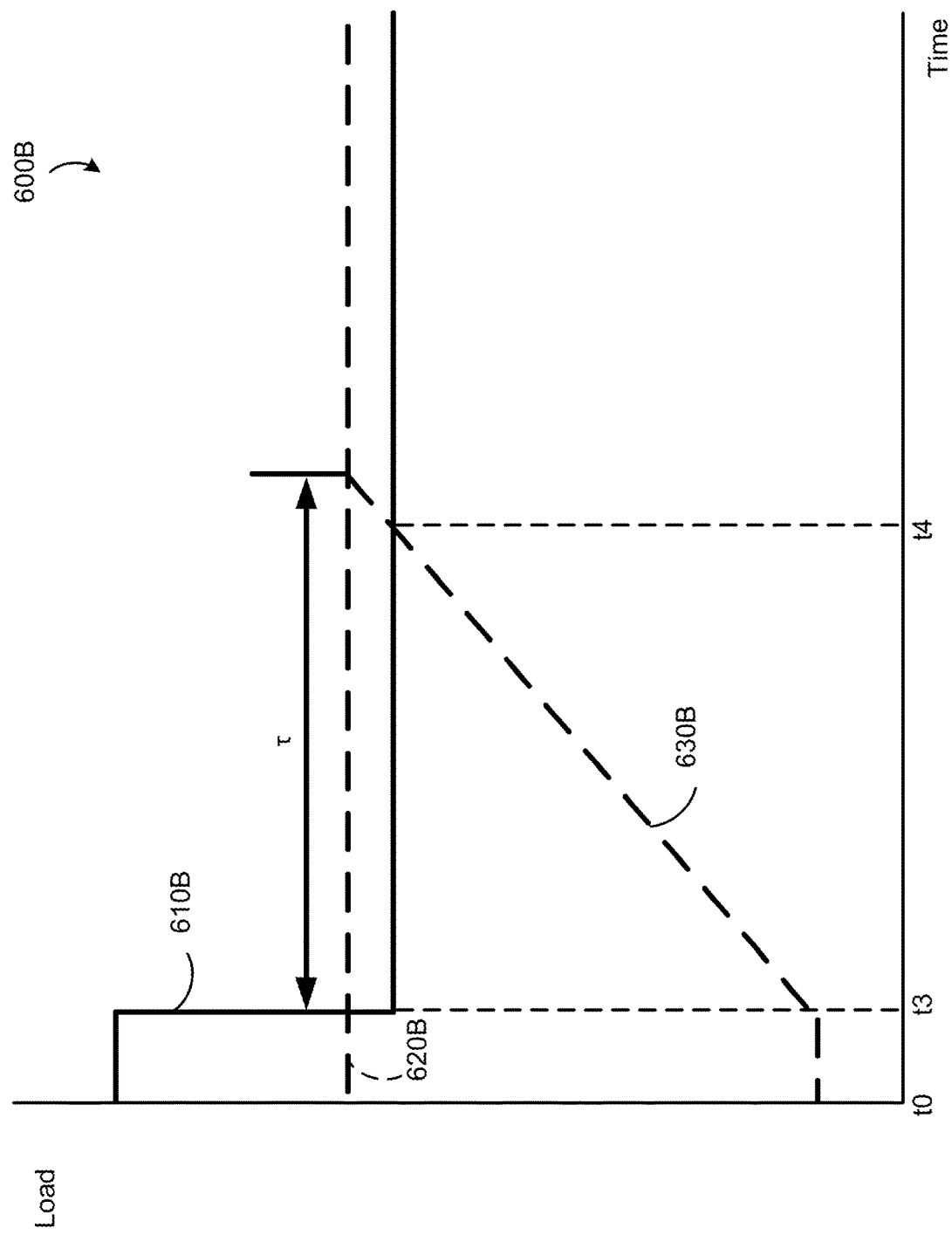
FIG. 6B is a timing diagram illustrating the adjusted capacity below the base capacity of the device increasing toward the base capacity after the change in requested load occurs, according to an exemplary embodiment.

FIG. 6B is a timing diagram 600B illustrating delaying cycling off (or disabling) a device, according to an exemplary embodiment. The timing diagram 600B includes plots 610B, 620B, 630B. Plot 610B represents requested load of one or more devices of the group of central plant equipment. Plot 620B represents a base capacity of the one or more devices of the group of central plant equipment. Plot 630B represents an adjusted capacity of the one or more devices of the group of central plant equipment. As shown in FIG. 6B, the requested load is above the base capacity at time t0. At time t0, the adjusted capacity is set at an initial value, which is, for example, 20% below the base capacity.

At time t3, the requested load changes to drop below the base capacity. In response to detecting that the requested load decreases below the base capacity, the central plant controller 102 increases the adjusted capacity. The central plant controller 102 may linearly increase the adjusted capacity for the decay period $\tau$, until the adjusted capacity reaches the base capacity.

While the adjusted capacity is decaying (e.g., increasing) during the decay period or after the adjusted capacity is changed to the base capacity, the central plant controller 102 compares the adjusted capacity and the requested load. In FIG. 6B, the central plant controller 102 detects that the requested load is below the increasing adjusted capacity at time t4. In response to detecting that the requested load is below the adjusted capacity at time t4, the central plant controller 102 disables a device of the one or more devices of the central plant equipment. Accordingly, disabling the device is delayed by a time period (e.g., t4-t3). If the requested load had not crossed the adjusted capacity, the central plant controller 102 would not disable the device. Hence, short cycling of the device can be avoided.

Figure 6C:
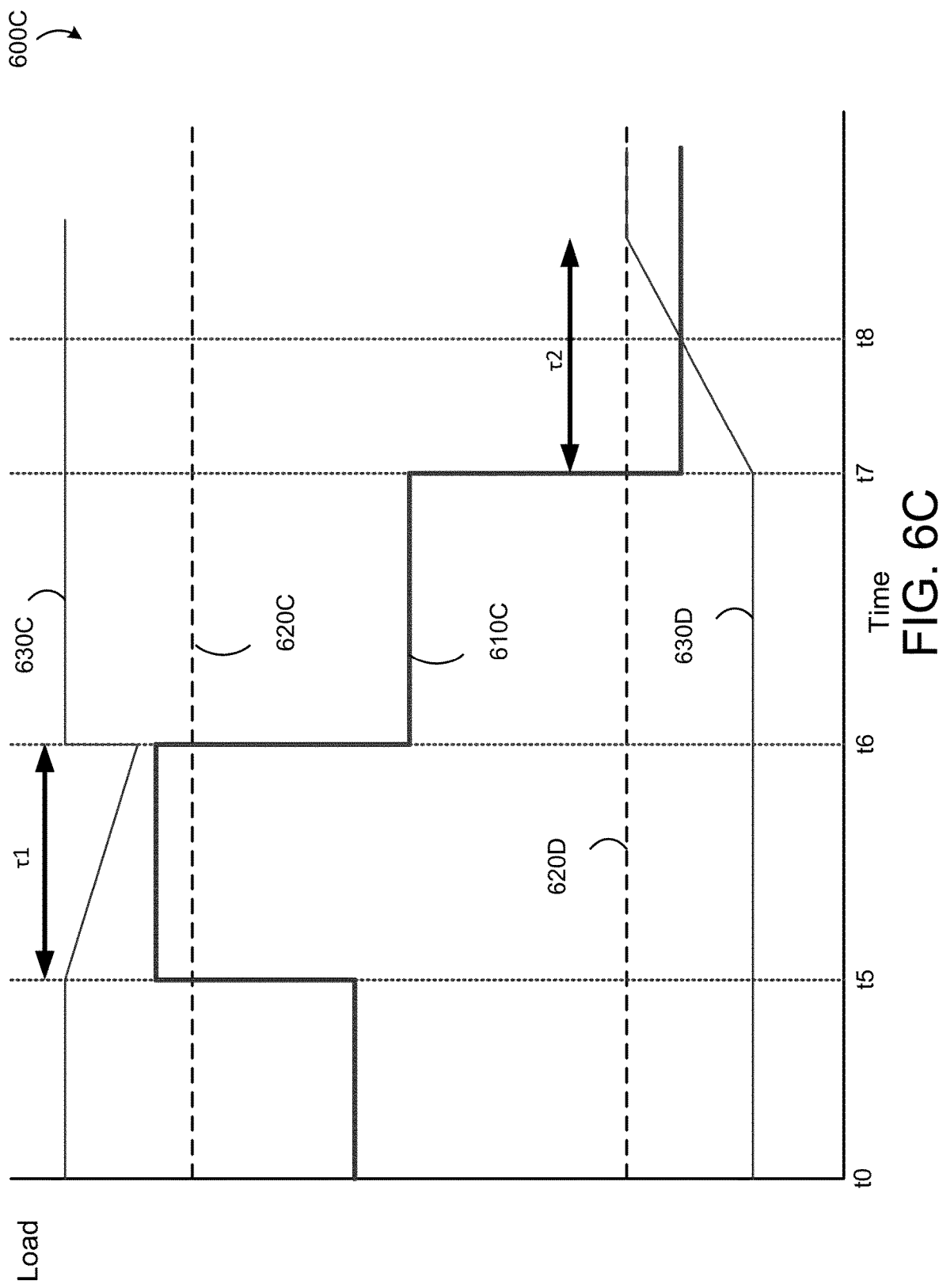
FIG. 6C is a timing diagram illustrating decaying multiple adjusted capacities, according to an exemplary embodiment.

FIG. 6C is a timing diagram 600C illustrating decaying multiple adjusted capacities, according to an exemplary embodiment. The timing diagram 600C includes plots 610C, 610D 620C, 630C, 630D. Plot 610C represents requested load of one or more devices of the group of central plant equipment. Plot 620C represents a base capacity of N number of devices of the group of central plant equipment. Plot 620D represents a base capacity of N−1 number of devices of the group of central plant equipment. Plot 630C represents a first adjusted capacity (or upper bound) of the Nth device of the group of central plant equipment. Plot 630D represents a second adjusted capacity (or lower bound) of the Nth device of the group of central plant equipment. As shown in FIG. 6C, the requested load is between the base capacity of the N−1 number of devices and the N number of devices at time t0. At time t0, the first adjusted capacity (or upper bound) is set at an initial value, which is, for example, 20% above the base capacity of the N number of devices and the second adjusted capacity (lower bound) is set at an initial value, which is, for example, 20% below the base capacity of the N−1 number of devices. At time t0, N number of devices of the group of central plant equipment may be operational.

At time t5, the requested load changes to exceed the base capacity of the N number of devices shown in the plot 620C. In response to detecting that the requested load exceeding the base capacity, the central plant controller 102 decays the first adjusted capacity (or upper bound) as represented by the plot 630C. The central plant controller 102 may linearly decay the first adjusted capacity (or upper bound) for the decay period Ti.

While the first adjusted capacity (or upper bound) is decaying (e.g., decreasing) during the decay period τ1, the central plant controller 102 compares the first adjusted capacity (or upper bound) and the requested load. In FIG. 6C, the central plant controller 102 detects that the requested load does exceed the first adjusted capacity for the decay period τ1 between time t5 and time t6. In response to detecting that the requested load dropping below the base capacity of the N number of devices at time t6, the central plant controller 102 maintains operation of N number of devices of the group of central plant equipment, because the first adjusted capacity has not crossed the requested load. The central plant controller 102 may reset the first adjusted capacity (or upper bound) to its initial value at time t6. If the requested load had crossed the first adjusted capacity (or upper bound), the central plant controller 102 would enable an additional device (e.g., N+1th device).

At time t7, the requested load changes to drop below the base capacity of the N−1 devices as shown in the plot 620D. In response to detecting that the requested load decreasing below the base capacity of the N−1 devices, the central plant controller 102 increases the second adjusted capacity (or lower bound) of the Nth device. The central plant controller 102 may linearly increase the second adjusted capacity (or lower bound) for the decay period τ2, until the second adjusted capacity (or lower bound) reaches the base capacity of the N−1 devices as shown in the plot 620D.

While the second adjusted capacity (or lower bound) is decaying (e.g., increasing) during the decay period τ2, the central plant controller 102 compares the second adjusted capacity (or lower bound) and the requested load. In FIG. 6C, the central plant controller 102 detects that the requested load is below the increasing second adjusted capacity at time t8. In response to detecting that the requested load is below the second adjusted capacity at time t8, the central plant controller 102 may disable the Nth device of the N number of devices of the central plant equipment. If the requested load had not crossed the second adjusted capacity (or lower bound), the central plant controller 102 would not disable the Nth device. Hence, short cycling of controlling the group of central plant equipment can be avoided.

FIG. 7 is timing diagrams 700A and 700B illustrating controlling a device, according to an exemplary embodiment. Timing diagram 700A includes plots 710, 720 illustrating operations of two devices without the disclosed delaying plant control. Timing diagram 700B includes plots 730, 740 illustrating operations of the two devices with the disclosed delaying plant control. In one aspect, the disclosed delaying plant control has an effect of filtering high frequency transitions. That is, short cycling of devices may be reduced or obviated by modifying threshold capacities for the decay period τ in response to detecting a change in the requested load, and delaying determination of the operation of the devices according to the changed threshold capacities. In one aspect, the central plant controller 102 would respond to gradual or continuous change in the requested load, rather than an impulse of the requested load. Accordingly, high frequency changes of devices in the timing diagram 700A without the disclosed delaying plant control may be obviated by implementing the disclosed delaying plant control as shown in the timing diagram 700B. Therefore, the devices may be operated in an energy efficient manner.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on memory or other machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products or memory comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A method for operating a group of central plant equipment to serve thermal energy loads of a building or building system, the method comprising:
    identifying a base capacity of one or more devices of the group of central plant equipment;
    detecting a change in requested load allocated to the one or more devices crossing the base capacity at a crossover time;
    setting an adjusted capacity of the one or more devices such that the adjusted capacity is offset from the base capacity before the crossover time and decays toward the base capacity during a decay period after the crossover time;
    comparing the requested load allocated to the one or more devices with the adjusted capacity after the crossover time; and
    operating the group of central plant equipment based on whether the requested load allocated to the one or more devices is above or below the adjusted capacity.

2. The method of claim 1, wherein setting the adjusted capacity of the one or more devices includes linearly decaying the adjusted capacity toward the base capacity during the decay period.

3. The method of claim 1, wherein setting the adjusted capacity of the one or more devices includes non-linearly decaying the adjusted capacity toward the base capacity during the decay period.

4. The method of claim 1, wherein setting the adjusted capacity of the one or more devices includes offsetting the adjusted capacity prior to the crossover time to be higher than the base capacity, and decreasing the adjusted capacity toward the base capacity during the decay period.

5. The method of claim 4, wherein operating the group of central plant equipment includes:
    activating a device of the one or more devices, in response to the adjusted capacity dropping below the requested load.

6. The method of claim 1, wherein setting the adjusted capacity of the one or more devices includes offsetting the adjusted capacity prior to the crossover time to be lower than the base capacity, and increasing the adjusted capacity toward the base capacity during the decay period.

7. The method of claim 6, wherein operating the group of central plant equipment includes:
    deactivating a device of the one or more devices, in response to the adjusted capacity rising above the requested load.

8. A non-transitory computer readable medium for operating a group of central plant equipment to serve thermal energy loads of a building or building system, the non-transitory computer readable medium storing instructions when executed by a processor cause the processor to:
    identify a base capacity of one or more devices of the group of central plant equipment;
    detect a change in requested load allocated to the one or more devices crossing the base capacity at a crossover time;
    set an adjusted capacity of the one or more devices such that the adjusted capacity is offset from the base capacity before the crossover time and decays toward the base capacity during a decay period after the crossover time;
    compare the requested load allocated to the one or more devices with the adjusted capacity after the crossover time; and
    operate the group of central plant equipment based on whether the requested load allocated to the one or more devices is above or below the adjusted capacity.

9. The non-transitory computer readable medium of claim 8, wherein the instructions when executed by the processor cause the processor to set the adjusted capacity of the one or more devices further include instructions when executed by the processor cause the processor to linearly decay the adjusted capacity toward the base capacity during the decay period.

10. The non-transitory computer readable medium of claim 8, wherein the instructions when executed by the processor cause the processor to set the adjusted capacity of the one or more devices further include instructions when executed by the processor cause the processor to non-linearly decay the adjusted capacity toward the base capacity during the decay period.

11. The non-transitory computer readable medium of claim 8, wherein the instructions when executed by the processor cause the processor to set the adjusted capacity of the one or more devices further include instructions when executed by the processor cause the processor to offset the adjusted capacity prior to the crossover time to be higher than the base capacity, and decrease the adjusted capacity toward the base capacity during the decay period.

12. The non-transitory computer readable medium of claim 11, wherein the instructions when executed by the processor cause the processor to operate the group of central plant equipment further include instructions when executed by the processor cause the processor to:
    activate a device of the one or more devices, in response to the adjusted capacity dropping below the requested load.

13. The non-transitory computer readable medium of claim 8, wherein the instructions when executed by the processor cause the processor to set the adjusted capacity of the one or more devices further include instructions when executed by the processor cause the processor to offset the adjusted capacity prior to the crossover time to be lower than the base capacity, and increase the adjusted capacity toward the base capacity during the decay period.

14. The non-transitory computer readable medium of claim 13, wherein the instructions when executed by the processor cause the processor to operate the group of central plant equipment further include instructions when executed by the processor cause the processor to:

deactivate a device of the one or more devices, in response to the adjusted capacity rising above the requested load.

15. A system for operating a group of central plant equipment to serve thermal energy loads of a building or building system, comprising:

a processor; and a non-transitory computer readable medium storing instructions when executed by the processor cause the processor to:

identify a base capacity of one or more devices of the group of central plant equipment;

detect a change in requested load allocated to the one or more devices crossing the base capacity at a crossover time;

set an adjusted capacity of the one or more devices such that the adjusted capacity is offset from the base capacity before the crossover time and decays toward the base capacity during a decay period after the crossover time;

compare the requested load allocated to the one or more devices with the adjusted capacity after the crossover time; and operate the group of central plant equipment based on whether the requested load allocated to the one or more devices is above or below the adjusted capacity.

16. The system of claim 15, wherein the instructions when executed by the processor cause the processor to set the adjusted capacity of the one or more devices further include instructions when executed by the processor cause the processor to linearly decay the adjusted capacity toward the base capacity during the decay period.

17. The system of claim 15, wherein the instructions when executed by the processor cause the processor to set the adjusted capacity of the one or more devices further include instructions when executed by the processor cause the processor to non-linearly decay the adjusted capacity toward the base capacity during the decay period.

18. The system of claim 15, wherein the instructions when executed by the processor cause the processor to set the adjusted capacity of the one or more devices further include instructions when executed by the processor cause the processor to offset the adjusted capacity prior to the crossover time to be higher than the base capacity, and decrease the adjusted capacity toward the base capacity during the decay period.

19. The system of claim 18, wherein the instructions when executed by the processor cause the processor to operate the group of central plant equipment further include instructions when executed by the processor cause the processor to:

activate a device of the one or more devices, in response to the adjusted capacity dropping below the requested load.

20. The system of claim 15, wherein the instructions when executed by the processor cause the processor to set the adjusted capacity of the one or more devices further include instructions when executed by the processor cause the processor to offset the adjusted capacity prior to the crossover time to be lower than the base capacity, and increase the adjusted capacity toward the base capacity during the decay period.

* * * * *